US012683757B2

(12) United States Patent
Azouaoui et al.

(10) Patent No.: US 12,683,757 B2
(45) Date of Patent: Jul. 14, 2026

(54) ADAPTIVE COUNTERMEASURE FOR BIT LEAKAGE IN LATTICE-BASED CRYPTOGRAPHY

(71) Applicant: NXP B.V., Eindhoven (NL)

(72) Inventors: Melissa Azouaoui, Norderstedt (DE); Tobias Schneider, Graz (AT); Markus Schoenauer, Vienna (AT)

(73) Assignee: NXP B.V., Eindhoven (NL)

( * ) Notice: Subject to any disclaimer, the term of this patent is extended or adjusted under 35 U.S.C. 154(b) by 462 days.

(21) Appl. No.: 18/090,999

(22) Filed: Dec. 29, 2022

(65) Prior Publication Data

US 2024/0223354 A1     Jul. 4, 2024

(51) Int. Cl.
*H04L 9/00* (2022.01)
*H04L 9/30* (2006.01)
*H04L 9/32* (2006.01)

(52) U.S. Cl.
CPC ............ *H04L 9/002* (2013.01); *H04L 9/3093* (2013.01); *H04L 9/3218* (2013.01); *H04L 9/3247* (2013.01)

(58) Field of Classification Search
CPC ..... H04L 9/002; H04L 9/3093; H04L 9/3218; H04L 9/3247; H04L 9/085; H04L 2209/046; H04L 2209/08; H04L 9/003
See application file for complete search history.

(56) References Cited

U.S. PATENT DOCUMENTS 9,143,325 B2     9/2015    Chen et al.
2017/0353302 A1*  12/2017   Fernandez ................ H04L 9/14

FOREIGN PATENT DOCUMENTS

CN        107231229 B      10/2020
GB        2620988 A    *   1/2024    ............. H04L 9/003

OTHER PUBLICATIONS

Ducas, Léo, Crystals-dilithium: A lattice-based digital signature scheme. IACR Transactions on Cryptographic Hardware and Embedded Systems (2018): pp. 238-268. (Year: 2018).*
Azouaoui, Melissa et al.; "Leveling Dilithium against Leakage: Revisited Sensitivity Analysis and Improved Implementations"; International Association for Cryptologic Research, Oct. 17, 2022; vol. 20221017:084434; retrieved from the internet at https://eprint.iacr.org/archive/2022/1406/1665996274.pdf.
Saarinen, Markku-Juhani O.; "Masked Key Wrapping and Mask Compression"; International Association for Cryptologic Research; Nov. 2, 2022; vol. 20221102:220331, retrieved from the internet at https://eprint.iacr.org/archive/2022/1499/1667426611.pdf.

(Continued)

*Primary Examiner* — Kevin Ayala

(57)        ABSTRACT
A device may include a computer-readable memory and an integrated circuit including a processor configured to implement a cryptographic operation, wherein the cryptographic operation enables computation of a cryptographic result using a bit masking value y. The processor may be configured to access the computer-readable memory to determine a set of bit indexes, wherein each bit index in the set of bit indexes is associated with a bit value in the bit masking value y, for each bit index in the set of bit indexes, calculate an adaptive share value in which the bit value associated with the bit index is masked, and execute a cryptographic operation using the adaptive share value.

20 Claims, 6 Drawing Sheets

(56) References Cited

OTHER PUBLICATIONS

Bai, Shi et al, Algorithm Specification and Supporting Documentation, Crystals—Dilithium, Feb. 8, 2021, pp. 1-38, Version 3.1.

Heinz, Daniel et al., Combined Fault and DPA Protection for Lattice-Based Cryptography, 2021, pp. 1-30, Cryptology ePrint Archive, Report 2021/101, 2021, https://ia.cr/2021/101.

Liu, Yuejun, On the Security of Lattice-Based Fiat-Shamir Signatures in the Presence of Randomness Leakage, 2021, pp. 1868-1879, vol. 16, IEEE Transactions on Information Forensics and Security.

Migliore, Vincent et al., Masking Dilithium: Efficient Implementation and Side-Channel Evaluation, Applied Cryptography and Network Security: 17th International Conference, ACNS 2019, Jun. 2019, pp. 344-362, Lecture Notes in Computer Science, vol. 11464, Springer, Bogota, Columbia.

Nassar, Maxime et al., Formal Analysis of the Entropy / Security Trade-off in First-Order Masking Countermeasures against Side-Channel Attacks, Progress in Cryptology—Indocrypt 2011 12th International Conference on Cryptology in India, Chennai, India, Dec. 11-14, 2011, Lecture Notes in Computer Science, 2011, pp. 1-30, vol. 7107, Springer, Berlin, Heidelberg.

Rivian, Matthieu et al., Provably Secure Higher-Order Masking of AES, Cryptographic Hardware and Embedded Systems, CHES 2010, 12th International Workshop, Santa Barbara, CA, USA, Aug. 17-20, 2010, Lecture Notes in Computer Science, 2011, pp. 1-19, vol. 6225. Springer, Berlin, Heidelberg.

National Institute of Standards and Technology, Post-quantum cryptography standardization, https://csrc.nist.govProjects/Post-Quantum-Cryptography/Post-Quantum-Cryptography-Standardization.

\* cited by examiner

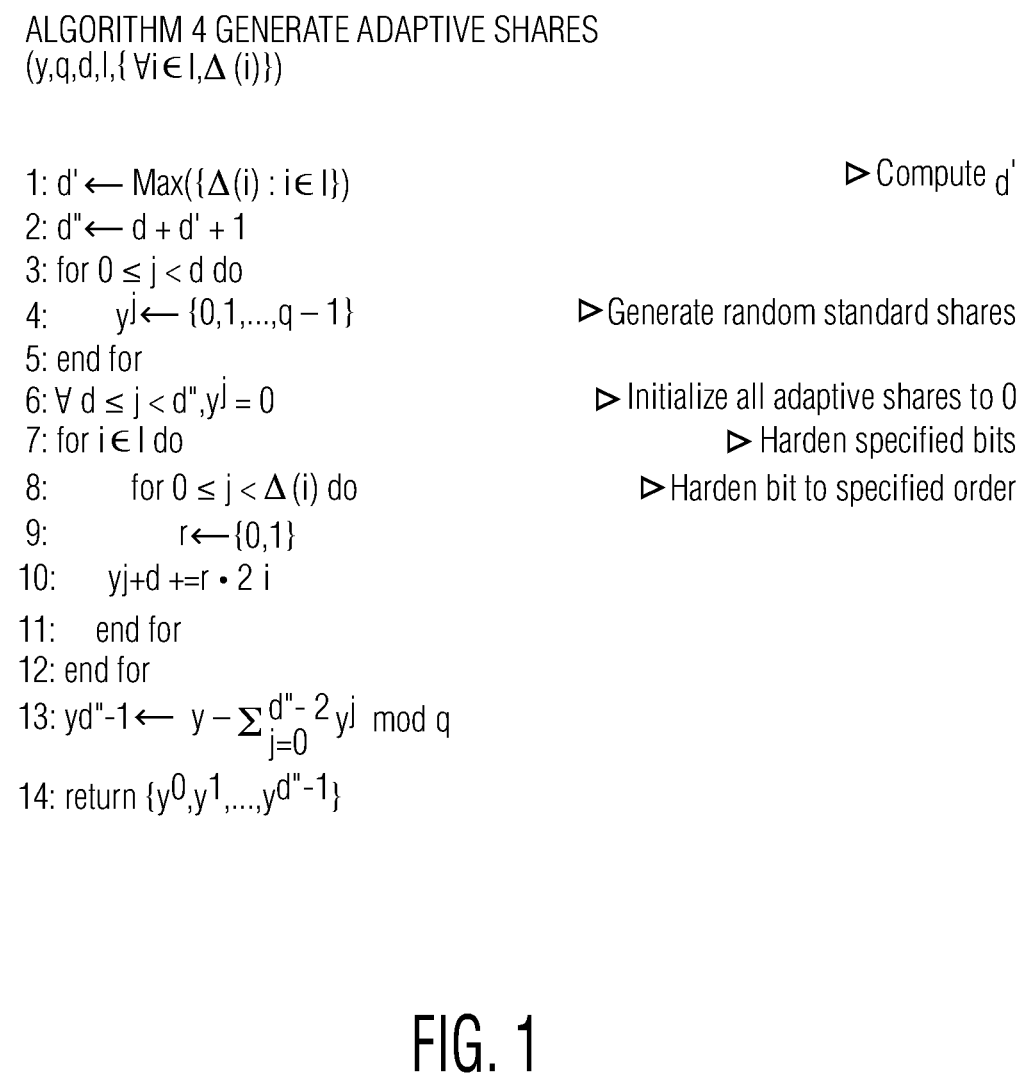

ALGORITHM 4 GENERATE ADAPTIVE SHARES
$(y,q,d,I,\{ \forall i \in I, \Delta (i)\})$ 1: $d' \leftarrow Max(\{\Delta(i) : i \in I\})$           ▷ Compute $d'$ 2: $d'' \leftarrow d + d' + 1$ 3: for $0 \leq j < d$ do 4:     $y^j \leftarrow \{0,1,...,q-1\}$         ▷ Generate random standard shares 5: end for 6: $\forall d \leq j < d'', y^j = 0$          ▷ Initialize all adaptive shares to 0

7: for $i \in I$ do                 ▷ Harden specified bits

8:     for $0 \leq j < \Delta (i)$ do       ▷ Harden bit to specified order

9:        $r \leftarrow \{0,1\}$

10:    $y^{j+d} += r \cdot 2^i$

11:    end for

12: end for

13: $y^{d''-1} \leftarrow y - \sum_{j=0}^{d''-2} y^j \mod q$

14: return $\{y^0, y^1,...,y^{d''-1}\}$

FIG. 1

| DILITHIUM LEVEL | STANDARD MASKING | | | PRESET APPROACH | | |
|---|---|---|---|---|---|---|
| | $2^{20}$ | $2^{40}$ | $2^{70}$ | $2^{20}$ | $2^{40}$ | $2^{70}$ |
| 2 ($\ell = 4$) | 47,104 | 94,208 | 188,416 | 11,264 | 27,264 | 55,296 |
| 3 ($\ell = 5$) | 58,880 | 117,760 | 235,520 | 14,080 | 34,560 | 69,120 |
| 5 ($\ell = 7$) | 82,432 | 164,864 | 329,728 | 19,712 | 48,384 | 96,768 |

FIG. 5

ADAPTIVE COUNTERMEASURE FOR BIT LEAKAGE IN LATTICE-BASED CRYPTOGRAPHY

TECHNICAL FIELD

The present disclosure is directed in general to a system and method for processing cryptographic data in electronic devices and, specifically, to a system and method for providing improved side channel protection in devices implementing lattice-based cryptography schemes.

BACKGROUND

Digital cryptography schemes play an important role in the world's data communication infrastructure. Such schemes underpin important authentication and transaction validation infrastructures in the form of digital certificates to secure digital transactions occurring on the Internet or across other communication networks. Often, such authentication and validation systems are implemented by devices participating in Internet of Things (IOT) networks or other types of sensors, actuators, and appliances, to transmit and receive data and to validate the authenticity of received instructions and commands.

To provide robust authentication and validation schemes in the face of new technology, recent significant advances in quantum computing have accelerated the research into postquantum cryptography schemes: cryptographic algorithms that run on classical computers but are still secure even when faced with an adversary with access to quantum computing resources. This demand is driven by interest from standardization bodies. This research involves evaluating potential lattice-based cryptography schemes as potential replacements for elliptic curve cryptography digital signatures (e.g., ECDSA), notably for embedded use cases. Similar to their elliptic-curve-cryptography-based counterparts, however, such lattice-based cryptography schemes can be targeted by algebraic side-channel attacks exploiting the leakage of a single bit of the random secret value.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 depicts steps in an algorithm for performing adaptive masking of bit values in a secret value y in accordance with the present disclosure.

FIG. 5 is a table depicting the number of randomness bits used by a standard masking approach when masking all the bits of the value y as compared to the number of randomness bits required when masking bits of the value y in accordance with the present disclosure.

DETAILED DESCRIPTION

Figure 2:
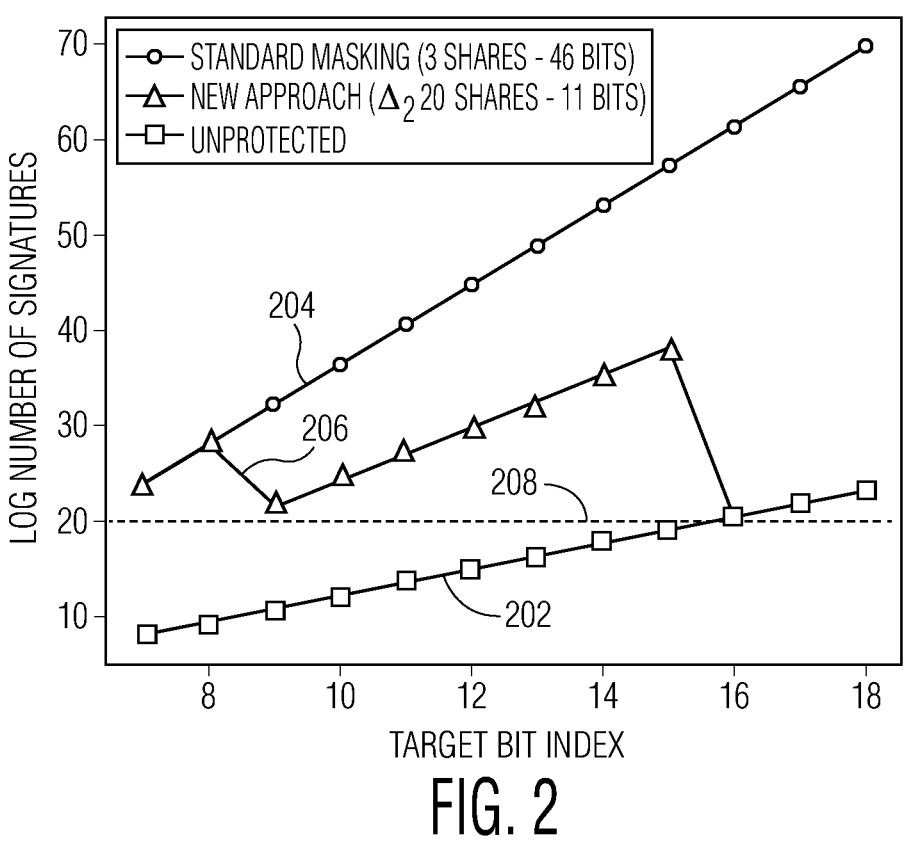
FIG. 2 is a chart that depicts levels of protection for bits in the secret value y of a DILITHIUM digital signature scheme, where parameters of the present bit masking algorithm are selected to protect against an attacker with access to fewer than $2^{20}$ signatures.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

The signing operation of a digital signature scheme generates a cryptographic signature value for a given message using a secret cryptographic key. If, while implementing the digital signature scheme, the value of the secret key is leaked or otherwise made accessible to third parties, that potential for third party knowledge of the secret key would invalidate the security properties provided by that digital signature scheme.

Some proposed post-quantum computing digital signature schemes have been shown to leak portions of the scheme's secret signing keys and/or the schemes secret masking vectors that are used to obfuscate the scheme's secret signing keys during signature processing via side-channel leakage. Side-channel leakage attacks may involve an attacker observing power consumption or electro-magnetic emissions of particular communication pins of various components of the device to detect voltage fluctuations enabling the attacker to extract data bits that are indicative of private key or secret masking values being processed by the device using side-channel analysis. Devices such as IoT devices, where the attacker has physical access to the device, may be particularly susceptible to these types of attacks as an attacker is free to access the internal components of the device. Additionally, attackers may be able to modify the operating conditions of the device, or otherwise alter components of the device, so that the data indicative of the device's private keys and secret masking values may be accessed.

In some such attacks, it may not be necessary for an attacker to know all the bits of a private key in order to break the digital signature scheme. For example, partial key or secret masking vector exposure attacks can allow an attacker to recover an entire private key from only a partial knowledge of the key's or secret masking value's bits. For example, in a similar manner to their elliptic-curve-cryptography-based counterparts, lattice-based cryptography schemes can be attacked using algebraic side-channel attacks that exploit the leakage of a single bit of the scheme secret masking vector's value. Here, the secret masking vector refers to a random and non-repeating value that is utilized by a digital signature scheme to protect the scheme's private keys each time a particular private key is used to sign a data input.

In some such lattice-based cryptography schemes, the index of the targeted bit in the masking vector can affect the effectiveness of such an attack. For example, it has been shown that the secret signing key $s_1$ employed by the DILITHIUM digital signature scheme can be recovered by extracting only a single bit of the masking vector y's coefficients from side-channel leakage that occurs over a number of signature generations. In this attack, the index of that single bit can affect how difficult it is to determine the value of the secret key. In the DILITHIUM scheme, knowledge of the value of the $8^{th}$ bit of the masking vector is the most useful for an attacker and requires an achievable minimum number of signatures (e.g., about 3000 signatures) in order for an attacker to retrieve the value of the scheme's private key. For each bit index increment (e.g., for the ninth bit of the secret masking vector value and so on), the number of required signatures for a successful attack and recovery of the private key increases dramatically.

In general, when applying these types of attacks to the DILITHIUM digital signature, the bits targeted in the side-channel attack tend to be the 8th to about the 19th bit of the secret masking value vector y. However, the bit values at different bit indexes in the secret masking vector y do not provide the same degree of usefulness to an attacker when attempting to recover a corresponding secret key $s_1$. For example, knowledge of the $8^{th}$ bit of the secret masking vector y enables the secret key $s_1$ to be recovered with only about 3,000 signatures, four times as many signatures are required to recover the secret key $s_1$ if only the 9th bit of the secret masking vector y is known, and so on. If only the $19^{th}$ bit of the secret masking vector y is known, for example, $2^{39}$ signature values are required.

In evaluating the security of a particular digital signature scheme, that security is evaluated based on the weakest link in the chain, which in this specific case is the $8^{th}$ bit of the scheme secret masking vector y. Standard masking techniques will generally protect all bits equally of a value, meaning that the same cost (e.g., in terms of computing power) is spent on protecting all bits each time the value is used, despite not all of those bits requiring the same level of protection.

Consequently, the present disclosure provides an adaptive bit masking technique that improves (i.e., reduces) the cost of protecting the secret masking vector y in a digital signature scheme, such as DILITHIUM, by enabling more efficient masking of the secret masking vector's y's bit values. In an embodiment, this improvement may be achieved by taking into account the weakness of the individual bit indexes of the secret masking vector y (i.e., with the $8^{th}$ bit being the weakest in the DILITHIUM scheme) and applying appropriate levels of protection (i.e., bit masking) across the bits of the secret nonce y to reduce the amount of randomness needed and thereby improve the robustness of the digital signature scheme's implementation.

In this disclosure, various embodiments of the present approach for improving bit protection against side-channel attacks are presented with respect to the DILITHIUM digital signature scheme, however, it should be understood that the present approach may be utilized to provide more efficient bit masking for any communication protocols to provide improved security. As such, the generalized version of this approach can be applied to other digital signature schemes (and encryption schemes in general) that may be vulnerable to bit leakage attacks, such as qTESLA or other schemes that utilize Fiat-Shamir with aborts signatures or comprise lattice-based signature schemes.

The present approach can be tailored to provide an adequate (and quantifiable) amount of improved security against bit leakage attacks without expending computing resources on protecting or masking bits that are of minimum use to an attacker. That can be useful in devices with limited computing resources (e.g., IoT devices or other devices with constrained memory and processing resources) where algorithmic efficiency is an important aspect when designing a bit masking algorithm. Important metrics for these types of bit masking implementations can include the number of operations required to implement the algorithm and the number of fresh random elements required for the masking scheme.

In the present approach, adaptive masking enables the most vulnerable bits of the target value to be protected, as such, the more susceptible a bit index is to an attack, the more that bit index is protected. As such, unnecessary computing time and random value generation requirements are minimized when protecting (i.e., masking) less vulnerable bits.

When signing a message using the DILITHIUM digital signature scheme or other similar cryptographic signature schemes, the signature algorithm relies upon a secret masking vector y when generating an output signature. To protect the secret masking vector y value, during processing the masking vector y is mathematically decomposed into a number of shares $y_i$ to reduce the likelihood that the entire value y can be retrieved by an attacker. Decomposition involves converting a secret value (i.e., y) into a plurality of other values that, taken individually provide no information about the secret value, but can be utilized as a whole to perform mathematical operations (e.g., cryptographic operations) that are equivalent to using the secret value to perform the operation. In this manner, the secret value itself is not utilized when performing the cryptographic operation. As such, the shares $y_i$ can then be used iteratively to accurately calculate a digital signature without exposing the true value of the secret masking vector y.

When generating the individual adaptive shares $y_i$ of the original vector y, the present disclosure provides an approach for generating different numbers of adaptive shares for different bit indexes in y, where the number of adaptive shares for each bit index are adjusted to provide different levels of protection to the different bit indexes of the value y (where the bits have different levels of vulnerability) to provide improved protection against side channel attacks.

In describing the present bit masking system, the following variables and/or functions are defined:

q: Modulus—a value that may be a prime number or a power of 2 that species the ranges of values that are used by the algorithm.

y: one arbitrary coefficient of y.

d: The number of standard masking shares.

d': The number of adaptive masking shares.

d": The total number of masking shares, which is equivalent to the sum of d+d'+1.

$x_i$: $i^{th}$ bit of variable x.

$x_j$: $j^{th}$ share of variable x.

x←S: x is randomly and uniformly picked from the set S.

I: A list that identifies the indexes of the bits of the value y that are to be hardened using adaptive shares.

$\Delta(i)$: A list that identifies for each bit index that is being protected (as specified by the list I), the number of adaptive shares that will be used to additionally harden the protection of the $i^{th}$ bit in the value y.

Max(S): The function computing the maximum value in a set S.

With these variables and/or functions established, the present approach for adaptive bit masking utilizes a combination of standard masking with specifically constructed shares to adaptively protect different bits of the sensitive value y. To this end, the approach generates d standard shares, and then generates d' specifically crafted shares to harden specific bits at specific indexes.

FIG. 1 depicts steps in an algorithm for performing adaptive masking of bit values in a secret value y in accordance with the present disclosure. Referring to FIG. 1, before execution of the algorithm, the values y, q, d, I, and $\{\forall i \in I, \Delta(i)\}$ are determined. In line 1, the number of adaptive masking shares d' is determined as the maximum number of adaptive shares that have been allocated for each bit (i.e., $\Delta(i)$) for each of the bits to be hardened (i.e., identified by I). In line 2, the total number of masking shares d'', is determined as the sum of the number of standard masking shares d plus the number of adaptive masking shares d'+1. The plus 1 value is utilized because the d and d' shares are all generated randomly, but in order to reconstruct the original y value it may be necessary to use one additional share (hence the +1) such that the sum of all d+d'+1 shares is equal to y. This last share is not generated randomly, but computed as y minus the sum of all d shares minus the sum of all d' shares.

With the d' and d' values determined, at line 3 the algorithm enters a loop that iterates through values of j from 0 to d−1 where, for each value of j, a random standard share is generated according to the expression $g \leftarrow \{0, 1, \ldots, q-1\}$, where $y^j$ represents the set of random standard shares. As such, the loop formed by lines 3, 4, and 5 in the algorithm of FIG. 1 generates a conventional set of d random shares.

In line 6, the algorithm initializes to zero values a set of additional adaptive shares according to the expression $\forall d \leq j < d''$, $y^j = 0$. As such, at the completion of line 6 a number of adaptive shares $y^j$ equal to d' (also equal to d'' minus d minus 1 based on line 2) have been initiated. In the algorithm, the initiation of a share involves setting the share value equal to 0.

Line 7 of the algorithm creates a loop in which the value i iterates through the values of each bit index that has been designated for hardening in the list I. For each bit to be hardened, line 8 creates a sub-loop in which the value j is iterated from 0 through the corresponding number of adaptive shares $\Delta(i)$ for the bit index designated by the variable i. In line 9, for each adaptive share a value r is generated as a random bit having a value of 0 or 1 and in line 10 the value equal to $r*2^i$ is added to the adaptive share $y^{j+d}$ to mask the bit at index i (the multiplication by the value $2^i$ causes the bit value r to be added to the adaptive share at the bit index i).

At line 13, after the adaptive shares have been generated for each bit designated in/for hardening, a final share value $y^{d''-1}$ is calculated as the original value y minus the sum of all shares $y^0$ through $y^{d''-2}$ modulus q. Specifically, line 13 of the algorithm corresponds to the computation of an additional last share value $y^{d''-1}$ that allows for the reconstruction of the value y such that the sum of all of its shares are equal to its value. Otherwise, without this last share, we would be performing the following computations on the shares of a random value instead of y. The modulus operation in line 13 is dictated by the DILITHIUM signature scheme because later steps in the algorithm are performed modulus q and expect inputs modulus q.

At line 14 the method ends by returning the values of all shares y0 through $y^{d''-1}$, which can then be utilized to execute a cryptographic operation, such as signing an input data set or a message or other form of data.

With the values returned in step 14, conventional techniques may be utilized to compute signature values using the shares of y. Such operations that utilize the shares of y are masked, for which algorithms are either straightforward, known or described in the literature or prior art. As such, existing signature scheme implementations may use the adaptive shares generated in accordance with this disclosure (and the algorithm of FIG. 1) in the same manner as a set of shares constructed according to conventional masking approaches that are not adaptive.

In conventional bit masking approaches, bit masking with d' shares requires $(d+d')\lceil \log_2(q) \rceil$ bits of randomness because each bit being masked is protected by the same number of shares. In contrast, the approach illustrated in FIG. 1 and described above requires only $d\lceil \log_2(q) \rceil + \Sigma_{i \in I} \Delta(i)$ bits of randomness. This approach can provide a particular level of security, while reducing the computational overhead. This can be of particular benefit to resource-constrained devices, such as IoT devices, as described herein.

An example of the present bit masking approach and its corresponding benefits are now presented with specific reference to the DILITHIUM digital signature scheme. It should be understood, however, that embodiments of the present bit masking approach may be utilized in conjunction with other types of digital signature schemes that are vulnerable to bit leakage attacks during a data signing process.

In the present example, the following values for auxiliary variables and functions are utilized.

q: prime modulus. It is equal to $q=2^{23}-2^{13}+1$.

n: number of polynomial coefficients, which is set to 256.

l: number of polynomials in the vector y. In this example l is equal to 4, 5 and 7 for National Institute of Standards and Technology (NIST) security levels 2, 3 and 5, respectively.

In embodiments of the DILITHIUM digital signature scheme, the $8^{th}$ bit of the secret value y, if known to an attacker, renders the signature scheme most vulnerable to an attacker. Bits with greater indexes are increasingly less vulnerable to an attacker. As such, bits with greater indexes do not require the same level of protection as implemented by varying number of shares being assigned to the respective bits. Consequently, by selecting particular parameters to be utilized by the present bit masking approach, where the parameters specify which bits of the value y require adaptive masking, it is possible to implement a desired level of side-channel security and protection for the signature scheme. Generally, as the side-channel security level of the scheme increases, the computing cost of implementing the scheme increases, so it can be possible to establish a set of parameters for the invention that achieves a desired level of side-channel security, while requiring minimal computing resource requirements (e.g., memory and processing power) enabling the scheme to be implemented by resource-constrained devices, such as IoT devices.

In specific examples, as detailed below, parameters may be selected to achieve desired levels of security for the DILITHIUM digital signature scheme to protect against an attacker in possession of, for example, $2^{20}$. $2^{40}$ and $2^{70}$ signatures. In these specific examples, low order bits are not masked (hence d=0), while bits that can be exploited for bit leakage attacks (i.e., bits of the secret masking vector y with indexes of 7 (equating to the $8^{th}$ bit) or greater are protected with adaptive shares in accordance with the algorithm depicted in FIG. 1.

In a first example, to provide adequate protection in the event that an attacker has access to $2^{20}$ signatures, the following parameters may be established: $I_{2^{20}}=\{7, 8, \ldots , 15\}$ and $\Delta_{2^{20}}=[2,2,1,1,1,1,1,1,1]$, such that d'=3.

In a second example, to provide adequate protection in the event that an attacker has access to $2^{40}$ signatures, the following parameters may be established: $I_{2^{40}}=\{7, 8, \ldots , 22\}$ and $\Delta_{2^{20}}=[4,4,3,3,2,2,2,2,2,1,1,1]$, such that d'=5.

In a third example, to provide adequate protection in the event that an attacker has access to $2^{70}$ signatures, the following parameters may be established: $I_{2^{70}}=\{7, 8, \ldots , 22\}$ and $\Delta_{2^{70}}=[8,7,6,5,5,4,4,4,3,3,3,2]$, such that d'=9. These approaches are now compared to three examples of standard masking approaches that utilized the same maximum number of shares $d' \in \{3,5,9\}$ in FIG. 2.

Specifically, FIG. 2 is a chart that depicts levels of protection for bits in the secret masking vector y of a DILITHIUM digital signature scheme, where parameters of the scheme are selected to protect against an attacker with access to up-to $2^{20}$ signatures. In FIG. 2, the horizontal axis represents bit indexes. The index values are only shown for the bits of the secret value y that are considered bits that may be subject to attacks (i.e., bits with index value of 7 or greater). The vertical axis represents the logarithm value of the number of signatures required for an attacker to successfully attack the signature scheme based on the value of a particular bit. In FIG. 2, line 202 represents the risk profile for the signature scheme when no bit protection is implemented. Line 204 represents the risk profile for the signature scheme when implementing conventional bit masking. Finally, line 206 represents the risk profile for the signature scheme when implementing the present adaptive bit masking approach. The horizontal line 208 represent the desired security level, as expressed by the number of signatures required to be known by an attacker before the digital scheme is likely to be broken.

As depicted in FIG. 2 and, specifically by line 206, the present adaptive bit masking approach can be configured to normalize the level of protection afforded to all of the risky bits in the value y, while providing that each bit is protected to a degree requiring an attacker have access to a number of signatures that exceeds the target amount (as indicated by dashed line 208). The conventional approach (as depicted by line 204) also provides adequate protection to each bit, but exhibits significant inefficiencies. Specifically, the conventional approach provides adequate protection to the riskiest bits (e.g., bits with indexes close to 8), while providing an excessive amount of protection to bits that are not particular risky. For example, the conventional approach protects the bit with index 18 (a bit that is not particularly risky) against about $2^{70}$ signatures. This excessive level of protection is indicative of wasted computing resources in the conventional bit masking approach. Specifically, in the $2^{20}$ case, the conventional approach (indicated by line 204) requires 46 bits of randomness to implement, while the present approach (indicated by line 206) requires only 11 bits of randomness to implement, a significant reduction in required resources.

Figure 3:
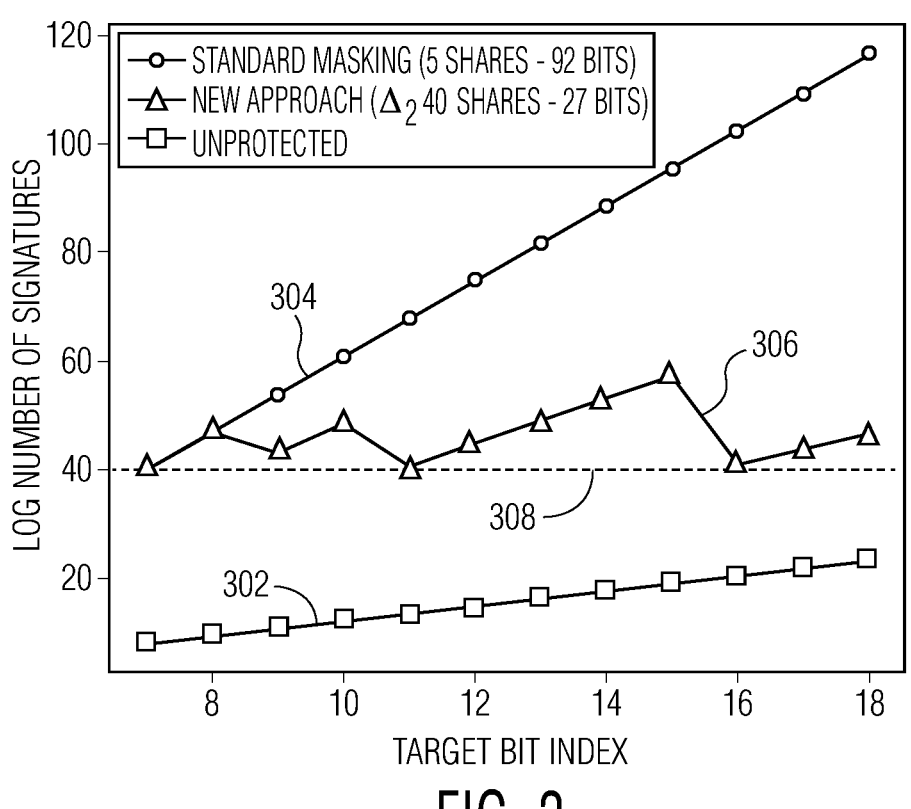
FIG. 3 is a chart that depicts levels of protection for bits in the secret value y of a DILITHIUM digital signature scheme, where parameters of the present bit masking algorithm are selected to protect against an attacker with access to fewer than $2^{40}$ signatures.

FIG. 3 is a chart that depicts levels of protection for bits in the secret vector y of a DILITHIUM digital signature scheme, where parameters of the scheme are selected to protect against an attacker with access to fewer than $2^{40}$ signatures. In FIG. 3, the horizontal axis represents bit index values. The index values are only shown for the bits of the secret value y that are considered bits that may be subject to attacks (i.e., bits with index value of 8 or greater). The vertical axis represents the logarithm value of the number of signatures required for an attacker to successfully attack the signature scheme based on the value of a particular bit. In FIG. 3, line 302 represents the risk profile for the signature scheme when no bit protection is implemented. Line 304 represents the risk profile for the signature scheme when implementing conventional bit masking. Finally, line 306 represents the risk profile for the signature scheme when implementing the present adaptive bit masking approach. The horizontal line 308 represents the desired security level, as expressed by the number of signatures required to be known by an attacker before the digital scheme is likely to be broken.

As depicted in FIG. 3 and, specifically by line 306, the present adaptive bit masking approach can be configured to normalize the level of protection afforded to all of the risky bits in the value y, while providing that each bit is protected to a degree requiring an attacker have access to a number of signatures that exceeds the target amount (as indicated by dashed line 308). The conventional approach (as depicted by line 304) also provides adequate protection to each bit, but exhibits significant inefficiencies. Specifically, the conventional approach provides adequate protection to the riskiest bits (e.g., bits with indexes close to 8), while providing an excessive amount of protection to bits that are not particular risky. For example, the conventional approach protects the bit with index 18 (a bit that is not particularly risky) against about $2^{117}$ signatures. This excessive level of protection is indicative of wasted computing resources in the conventional bit masking approach. Specifically, in the $2^{40}$ case, the conventional approach (indicated by line 304) requires 92 bits of randomness to implement, while the present approach (indicated by line 306) requires only 27 bits of randomness to implement, a significant reduction in required resources.

Figure 4:
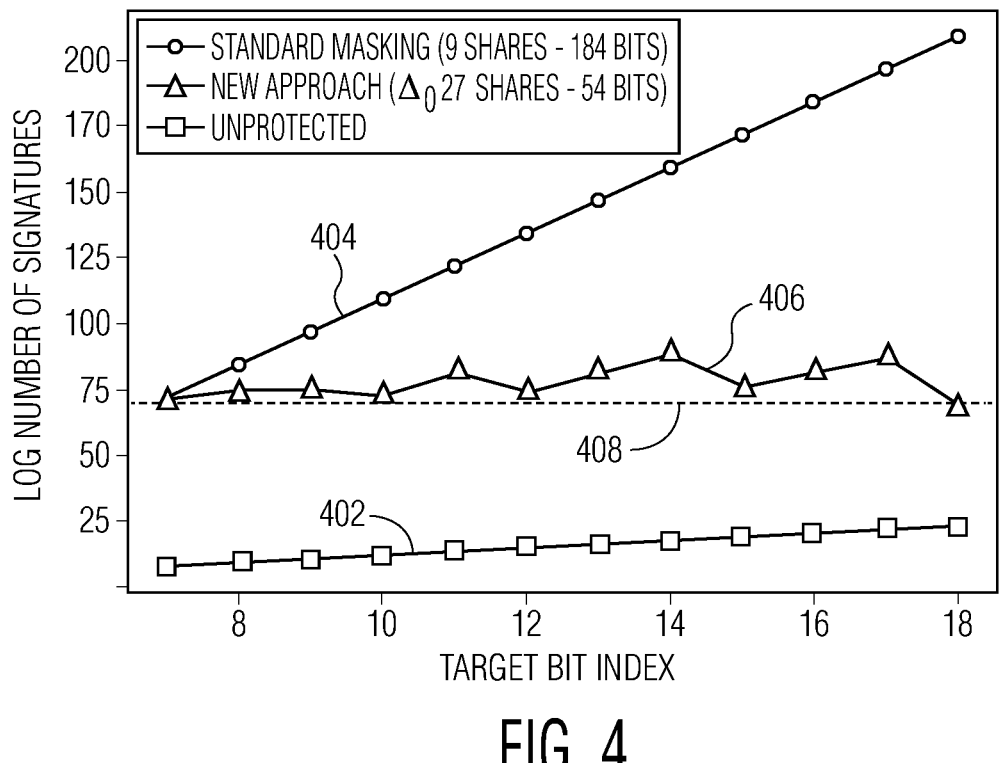
FIG. 4 is a chart that depicts levels of protection for bits in the secret value y of a DILITHIUM digital signature scheme, where parameters of the present bit masking algorithm are selected to protect against an attacker with access to fewer than $2^{70}$ signatures.

FIG. 4 is a chart that depicts levels of protection for bits in the secret value y of a DILITHIUM digital signature scheme, where parameters of the scheme are selected to protect against an attacker with access to fewer than $2^{70}$ signatures. In FIG. 4, the horizontal axis represents bit index values. The index values are only shown for the bits of the secret value y that are considered bits that may be subject to attack (i.e., bits with index value of 8 or greater). The vertical axis represents the logarithm value of the number of signatures required for an attacker to successfully attack the signature scheme based on the value of a particular bit. In FIG. 4, line 402 represents the risk profile for the signature scheme when no bit protection is implemented. Line 404 represents the risk profile for the signature scheme when implementing conventional bit masking. Finally, line 406 represents the risk profile for the signature scheme when implementing the present adaptive bit masking approach. The horizontal line 408 represents the desired security level, as expressed by the number of signatures required to be known by an attacker before the digital scheme is likely to be broken.

As depicted in FIG. 4 and, specifically by line 406, the present adaptive bit masking approach can be configured to normalize the level of protection afforded to all of the risky bits in the value y, while providing that each bit is protected to a degree requiring an attacker have access to a number of signatures that exceeds the target amount (as indicated by dashed line 408). The conventional approach (as depicted by line 404) also provides adequate protection to each bit, but exhibits significant inefficiencies. Specifically, the conventional approach provides adequate protection to the riskiest bits (e.g., bits with indexes close to 8), while providing an excessive amount of protection to bits that are not particular risky. For example, the conventional approach protects the bit with index 18 (a bit that is not particularly risky) against about $2^{210}$ signatures. This excessive level of protection is indicative of wasted computing resources in the conventional bit masking approach. Specifically, in the $2^{70}$ case, the conventional approach (indicated by line 304) requires 184 bits of randomness to implement, while the present approach (indicated by line 306) requires only 54 bits of randomness to implement, a significant reduction in required resources.

The charts depicted in FIGS. 2-4 provide illustrations of the present adaptive masking approach over a subset of bits in the secret masking vector y of a DILITHIUM digital signature scheme (i.e., bits with indexes of 8 through 18). To illustrate the full benefits of the present approach, FIG. 5 is a table depicting the number of randomness bits used by a standard masking approach when masking all the bits of the masking vector y as compared to the number of randomness bits required when masking bits of the value y in accordance with the present disclosure. The number of required randomness bits for each approach are provided for a number of different implementations of the DILITHIUM digital signature scheme for different values of l (i.e., the number of polynomials in the vector y). As illustrated by the table of FIG. 5, for each implementation of the DILITHIUM digital signature scheme, when using the present adaptive bit masking approach there are significant reductions in required randomness bits as compared to conventional masking approaches. Consequently, the present bit masking approach provides adequate protection across all vulnerable bits as standard masking with a lower randomness complexity. In addition, due to the smaller shares, some operations during the signature generation can be optimized and corresponding storage requirements may also be reduced enabling robust bit masking protection to be implemented by even lower-resource computing devices.

Figure 6:
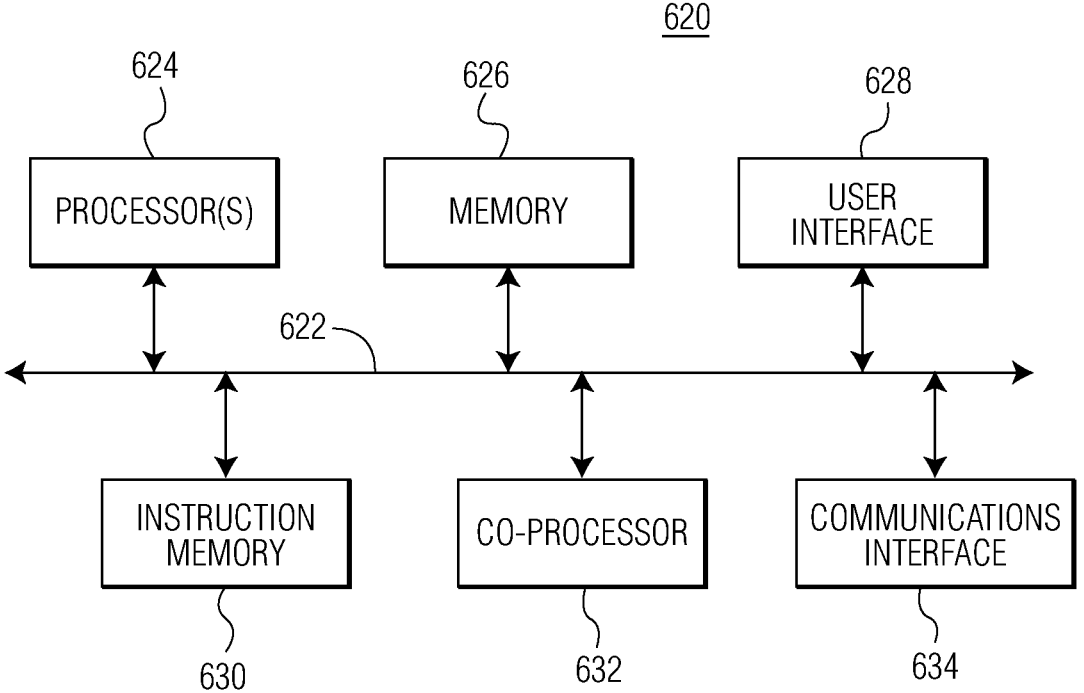
FIG. 6 is a block diagram depicting functional components of a data processing system including a co-processor for implementing the adaptive share bit masking approach of the present disclosure.

FIG. 6 is a block diagram depicting functional components of data processing system 620 including a co-processor 632 for implementing the adaptive share bit masking approach of the present disclosure. In various embodiments, data processing system 620 may include a low resource computing system, such as an IoT device or other device having constrained memory and processing power. An example data processing system 620, for example, may have 8 KB of working memory, some of which will be occupied by data stored by other processes running on data processing system 620. Consequently, such a device attempting to calculate and stream signature hash values may have about 4 KB of memory to perform that activity and may make it impossible for the device to perform.

Data processing system 620 may be a system-on-a-chip (SoC) implemented on a single integrated circuit, or it may be a combination of chips. In other embodiments, data processing system 620 may be implemented within an integrated circuit that may include another type of circuit such as an ASIC (application specific integrated circuit), FPGA (field programmable gate array), or the like, that can provide execute instructions. In one embodiment, data processing system 620 may include metal-oxide semiconductor (MOS) transistors fabricated using a conventional complementary metal-oxide semiconductor (CMOS) process. In another embodiment, data processing system 620 may include other transistor types, such as bipolar, and may be manufactured with a different process.

Data processing system 620 includes communication bus 622, processor(s) 624, memory 626, and cryptography co-processor 632. Bus 622 may be a conventional bus having a plurality of conductors for communicating address, data, and control information. In other embodiments, bus 622 may be an interconnect structure such as for example, a crossbar switch or other form of interconnect system. Processor(s) 624 is bi-directionally connected to bus 622. Processor(s) 624 may include one or more of any type of processing element, a processor core, microprocessor, microcontroller, field-programmable gate arrays (FPGAs), application-specific integrated circuits (ASICs), digital signal processor, and the like. There can be any number of processors.

Memory 626 is bi-directionally connected to bus 622. Memory 626 can be one or more of any type of volatile or non-volatile memory and is generally non-transitory. Examples of memory types include non-volatile memories such as flash, one-time programmable (OTP), EEPROM (electrically erasable programmable read only memory), and the like. Volatile memory types include static random-access memory (SRAM) and dynamic random-access memory (DRAM). The memory may be used for storing instructions and/or data.

In various embodiment, memory 626 may store data values and structure utilized when processor 624 implements the present adaptive bit masking approach. Such values stored by memory 626 may include the values y, q, d, I, and $\{\forall i \in I, \Delta(i)\}$, and others, which are described in detail above.

An optional user interface 628 can be bi-directionally connected to bus 622 and may be connected to one or more devices for enabling communication with a user such as an administrator. For example, user interface 628 may be enabled for coupling to a display, a mouse, a keyboard, or other input/output device. User interface 628 may also include a network interface having one or more devices for enabling communication with other hardware devices external to data processing system 620.

Instruction memory 630 may include one or more non-transitory machine-readable storage media for storing instructions for execution by processor(s) 624. In other embodiments, both memories 626 and 630 may store data upon which processor(s) 624 may operate. Memories 626 and 630 may also store, for example, instructions that, when executed by processor 624 (e.g., in combination with co-processor 632), causes processor(s) 624 to execute cryptographic functions for implementing a digital signature scheme, performing encryption and/or decryption, and/or performing data verification and validation applications. Memories 626 and 630 may be implemented in a secure hardware element and may be tamper resistant.

Co-processor 632 is bi-directionally connected to bus 622. Co-processor 632 may be a special type of a co-processor optimized for running post-quantum encryption/decryption security software configured to implement one or more digital signature schemes that may include lattice based signature schemes such as DILITHIUM and qTESLA. Accordingly, and in accordance with the described embodiments, co-processor 632 may be used to generate adaptive shares to provide improved security to secret bit masking values y utilized during execution of a digital signature scheme, as discussed above and illustrated in the algorithm of FIG. 1. The algorithm executed on co-processor 632, for example, may be used to encrypt/decrypt data and instructions in data processing system 620.

Network communication interface 634 is bi-directionally connected to bus 622 and is configured to transmit and receive data via a suitable communications network. In various embodiments, communications interface 634 may include a wired or wireless network adapter configured to communicate over a wired or wireless connection with a local area network. In other embodiments, communications interface 634 may be configured to communicate over a wide area network, such as a cellular network (e.g., LTE, 4G, 5G, etc.). Communications interface 634 is configured to transmit and receive data, such as cryptographic signatures, such as those described herein, to remove computing system that may, in turn, elect to validate and or otherwise utilize the cryptographic signatures. In various embodiments, for example, data processing system 620 may be configured to calculate a message signature for a data packet generated by processor(s) 624 of data processing system 620. In that case, both the signature and the data packet may be transmitted to a remote computer system that may, in turn, use the cryptographic signature to confirm the authenticity of the received data packet.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Figure 7:
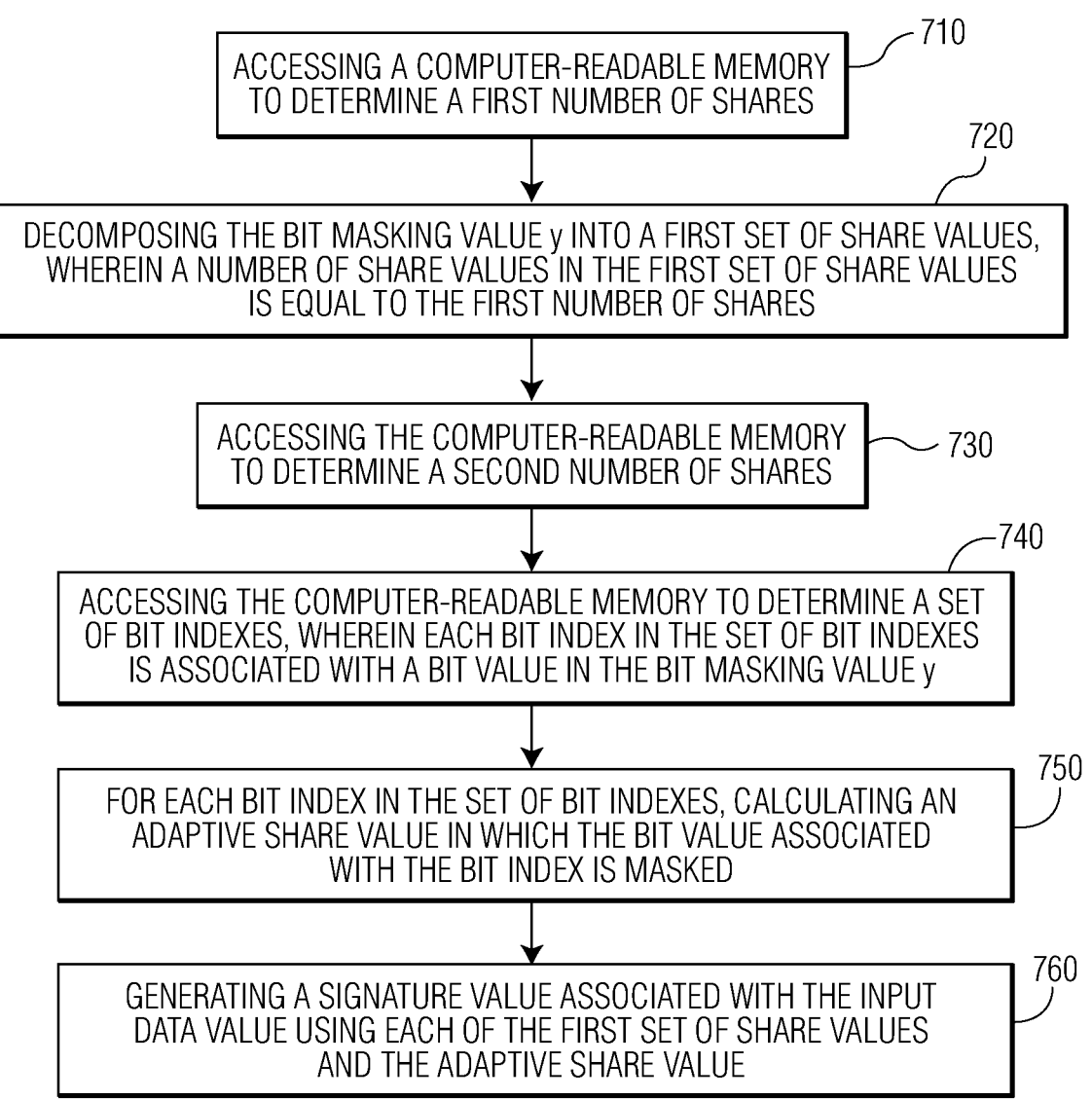
FIG. 7 is a flowchart of an example method for operating a device to implement an encryption scheme in accordance with the present disclosure.

FIG. 7 is a flowchart of an example method for operating a device to implement a signature scheme, wherein the signature scheme enables computation of a digital signature of an input data value using a bit masking value y and wherein different bits in the bit masking value y have different levels of vulnerability to a side channel leakage attack conducted using a communication pin of an integrated circuit. At step 710, a computer-readable memory is accessed to determine a first number of shares and at step 720, the bit masking value y is decomposed into a first set of share values, wherein a number of share values in the first set of share values is equal to the first number of shares. At step 730, the computer-readable memory is accessed to determine a second number of shares and at step 740, the computer-readable memory is accessed to determine a set of bit indexes, wherein each bit index in the set of bit indexes is associated with a bit value in the bit masking value y. At step 750, for each bit index in the set of bit indexes, calculating an adaptive share value in which the bit value associated with the bit index is masked and at step 760, a signature value associated with the input data value is generated using each of the first set of share values and the adaptive share value.

In some aspects, the techniques described herein relate to a device, including: a computer-readable memory; and an integrated circuit (IC) including a processor configured to implement a lattice-based digital signature scheme, wherein the lattice-based digital signature scheme enables computation of a digital signature of an input data value using a secret bit masking vector y and wherein different bits in the secret bit masking vector y have different levels of vulnerability to a side channel leakage attack conducted using a communication pin of the integrated circuit, the processor being configured to: access the computer-readable memory to determine a first number of shares, decompose the secret bit masking vector y into a first set of share values, wherein a number of share values in the first set of share values is equal to the first number of shares, access the computer-readable memory to determine a set of bit indexes, wherein each bit index in the set of bit indexes is associated with a bit value in the secret bit masking vector y, for each bit index in the set of bit indexes, calculate an adaptive share value in which the bit value associated with the bit index is masked, and generate a cryptographic signature value associated with the input data value using each of the first set of share values and the adaptive share value.

In some aspects, the techniques described herein relate to a device, including: a computer-readable memory; and an integrated circuit including a processor configured to implement a cryptographic operation, wherein the cryptographic operation enables computation of a cryptographic result using a bit masking value y, the processor being configured to: access the computer-readable memory to determine a set of bit indexes, wherein each bit index in the set of bit indexes is associated with a bit value in the bit masking value y, for each bit index in the set of bit indexes, calculate an adaptive share value in which the bit value associated with the bit index is masked, and execute a cryptographic operation using the adaptive share value.

In some aspects, the techniques described herein relate to a method operating a device to implement a lattice-based digital signature scheme, wherein the lattice-based digital signature scheme enables computation of a digital signature of an input data value using a bit masking value y and wherein different bits in the bit masking value y have different levels of vulnerability to a side channel leakage attack conducted using a communication pin of an integrated circuit, the method including: accessing a computer-readable memory to determine a first number of shares; decomposing the bit masking value y into a first set of share values, wherein a number of share values in the first set of share values is equal to the first number of shares; accessing the computer-readable memory to determine a set of bit indexes, wherein each bit index in the set of bit indexes is associated with a bit value in the bit masking value y; for each bit index in the set of bit indexes, calculating an adaptive share value in which the bit value associated with the bit index is masked; and generating a digital signature value associated with the input data value using each of the first set of share values and the adaptive share value.

Although the examples have been described with reference to automotive radar systems, the systems and methods described herein may be implemented in conjunction with other types of radar systems. Devices or components described as being separate may be integrated in a single physical device. Also, the units and circuits may be suitably combined in one or more semiconductor devices. That is, the devices described herein may be implemented as a single integrated circuit, or as multiple integrated circuits.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device comprising:

a computer-readable memory; and an integrated circuit (IC) including a processor configured to implement a lattice-based digital signature scheme, wherein the lattice-based digital signature scheme enables computation of a digital signature of an input data value using a secret bit masking vector y and wherein different bits in the secret bit masking vector y have different levels of vulnerability to a side channel leakage attack conducted using a communication pin of the integrated circuit, the processor configured to:

access the computer-readable memory to determine a first number of shares, decompose the secret bit masking vector y into a first set of share values, wherein a number of share values in the first set of share values is equal to the first number of shares, access the computer-readable memory to determine a set of bit indexes, wherein each bit index in the set of bit indexes is associated with a bit value in the secret bit masking vector y, determine selected bit indexes to be protected from the set of bit indexes;

determine a number of adaptive masking shares allocated for each selected bit index to be protected;

for each bit index in the set of bit indexes:

select a bit index from the set of bit indexes;

create, in the computer-readable memory, a plurality of adaptive masking shares corresponding to the number of adaptive masking shares allocated for the selected bit index;

initialize each adaptive masking share of the plurality of adaptive masking shares to an initial value;

determine an adaptive share value for each adaptive masking share of the plurality of adaptive masking shares based on the initial value and a random value r; and mask the bit value associated with the selected bit index by adding the adaptive share value of each of the plurality of adaptive masking shares to the bit value to produce a protected masking vector, and generate a cryptographic signature value associated with the input data value using the protected masking vector.

2. The device of claim 1, wherein the processor is further configured to:

access a list stored in the computer-readable memory to determine, for each bit index in the set of bit indexes, the number of adaptive shares.

3. The device of claim 1, wherein:

the initialized adaptive share is set to a zero value; and the processor is configured to, for each bit index in the set of bit indexes, calculate the adaptive share value in which the bit value associated with the bit index is masked by:

determining the random value r, wherein the random value r has a value of 0 or 1;

multiplying the random value r by $2^i$, wherein i is equal to the bit index, to generate the masking value; and adding the initialized adaptive share and the masking value to generate the adaptive share value.

4. The device of claim 1, wherein the processor is configured to generate the cryptographic signature value associated with the input data value based on the first set of share values and the plurality of adaptive share values for the set of bit indexes.

5. The device of claim 1, wherein the lattice-based digital signature scheme is a Fiat-Shamir lattice-based cryptography scheme.

6. The device of claim 5, wherein the lattice-based cryptography scheme is a DILITHIUM digital signature scheme.

7. The device of claim 6, wherein the set of bit indexes includes an 8th bit of the secret bit masking vector y.

8. A device comprising:

a computer-readable memory; and an integrated circuit including a processor configured to implement a cryptographic operation, wherein the cryptographic operation enables computation of a cryptographic result using a bit masking value y, the processor being configured to:

access the computer-readable memory to determine a set of bit indexes, wherein each bit index in the set of bit indexes is associated with a bit value in the bit masking value y, determine selected bit indexes to be protected from the set of bit indexes;

determine a number of adaptive masking shares allocated for each selected bit index to be protected;

for each bit index in the set of bit indexes, select a bit index from the set of bit indexes;

create, in the computer-readable memory, a plurality of adaptive shares corresponding to the number of adaptive masking shares allocated for the selected bit index;

initialize each adaptive masking share of the plurality of adaptive masking shares allocated for the selected bit index to an initial value;

calculate an adaptive share value for each adaptive masking share of the plurality of adaptive masking shares allocated for the selected bit index based on the initial value and a random number;

mask the bit value associated with the selected bit index by adding the adaptive share value of each of the plurality of adaptive masking shares to the bit value to produce a protected masking value, and execute a cryptographic operation using the protected masking value.

9. The device of claim 8, wherein the processor is further configured to:

access a list stored by the computer-readable memory to determine, for each bit index in the set of bit indexes, the number of adaptive masking shares.

10. The device of claim 8, wherein the initial value is set to a zero value and wherein the processor is configured to, for each bit index in the set of bit indexes, calculate the adaptive share value by:

determining the random value r, wherein the random value r has a value of 0 or 1;

multiplying the random value r by $2^i$, wherein i is equal to the bit index, to generate a masking value; and adding the initialized adaptive share and the masking value to generate the adaptive share value.

11. The device of claim 8, wherein executing the cryptographic operation includes generating a digital signature value using the protected masking value.

12. The device of claim 8, wherein the cryptographic operation includes a Fiat-Shamir lattice-based cryptography scheme.

13. The device of claim 12, wherein the cryptographic operation includes a DILITHIUM digital signature scheme.

14. The device of claim 13, wherein the set of bit indexes includes an 8th bit of the bit masking value y.

15. A method operating a device to implement a lattice-based digital signature scheme, wherein the lattice-based digital signature scheme enables computation of a digital signature of an input data value using a bit masking value y and wherein different bits in the bit masking value y have different levels of vulnerability to a side channel leakage attack conducted using a communication pin of an integrated circuit, the method comprising including:

accessing a computer-readable memory to determine a first number of shares;

decomposing the bit masking value y into a first set of share values, wherein a number of share values in the first set of share values is equal to the first number of shares;

accessing the computer-readable memory to determine a set of bit indexes, wherein each bit index in the set of bit indexes is associated with a bit value in the bit masking value y;

determining selected bit indexes to be protected from the set of bit indexes;

determining a number of adaptive masking shares allocated for each selected bit index to be protected;

for each bit index in the set of bit indexes:

selecting a bit index from the set of bit indexes;

creating a plurality of adaptive masking shares corresponding to the number of adaptive masking shares allocated for the selected bit index;

calculating an adaptive share value for each adaptive masking share of the plurality of adaptive masking shares based on the initial value and a random value r; and masking the bit value associated with the selected bit index by adding the adaptive share value of each of the plurality of adaptive masking shares to the bit value to produce a protected masking vector based on a predetermined number of adaptive shares; and generating a digital signature value associated with the input data value using the protected masking vector.

16. The method of claim 15, further comprising:

accessing the computer-readable memory to determine, for each bit index in the set of bit indexes, a predetermined number of adaptive shares; and for each bit index in the set of bit indexes, calculating a number of adaptive shares equal to the predetermined number of adaptive shares for the bit index.

17. The method of claim 15, further comprising, for each bit index in the set of bit indexes, calculating the adaptive share value in which the bit value associated with the bit index is masked by:

creating, in the computer-readable memory, an initialized adaptive share;

determining a random value r, wherein the random value r has a value of 0 or 1;

multiplying the random value r by $2^i$, wherein i is equal to the bit index, to generate a masking value; and adding the initialized adaptive share and the masking value to generate the adaptive share value.

18. The method of claim 15, further comprising generating the digital signature value associated with the input data value using each of the first set of share values and the adaptive share value.

19. The method of claim 15, further comprising determining that the lattice-based digital signature scheme is a DILITHIUM digital signature scheme.

20. The method of claim 19, further comprising determining that the set of bit indexes includes an 8th bit of the bit masking value y.

* * * * *